(12) United States Patent
Macey et al.

(10) Patent No.: US 11,854,021 B2
(45) Date of Patent: Dec. 26, 2023

(54) DATA SECURITY

(71) Applicant: Barclays Execution Services Limited, London (GB)

(72) Inventors: Anthony A. Macey, London (GB); Harry Powell, London (GB); Richard Craibe William Martin, London (GB); Antoine Amend, London (GB)

(73) Assignee: Barclays Execution Services Limited, London (GB)

( * ) Notice: Subject to any disclaimer, the term of this patent is extended or adjusted under 35 U.S.C. 154(b) by 674 days.

(21) Appl. No.: 16/976,656

(22) PCT Filed: Feb. 28, 2019

(86) PCT No.: PCT/GB2019/050557
§ 371 (c)(1),
(2) Date: Aug. 28, 2020

(87) PCT Pub. No.: WO2019/166811
PCT Pub. Date: Sep. 6, 2019

(65) Prior Publication Data
US 2020/0410135 A1    Dec. 31, 2020

(30) Foreign Application Priority Data

Feb. 28, 2018 (GB) .................... 1803275

(51) Int. Cl.
*G06F 21/62* (2013.01)
*G06Q 30/0201* (2023.01)
(Continued)

(52) U.S. Cl.
CPC ....... *G06Q 30/0201* (2013.01); *G06F 18/211* (2023.01); *G06F 18/23213* (2023.01); *G06F 21/6254* (2013.01)

(58) Field of Classification Search
CPC ............... G06Q 30/0201; G06F 18/211; G06F 18/23213; G06F 21/6254
See application file for complete search history.

(56) References Cited

U.S. PATENT DOCUMENTS

| 11,526,573 B1* | 12/2022 | Gassner | ................ H04L 67/564 |
| 2015/0379510 A1* | 12/2015 | Smith | ................ G06Q 20/3829 705/71 |

(Continued)

OTHER PUBLICATIONS

"Blockchain," Wikipedia, Nov. 15, 2017. Retrieved from the Internet on Apr. 2, 2019 from (https://en.wikipedia.org/w/index.php?title=Blockchain&oldid=810512431#Alternative_blockchains). 10 pages.

(Continued)

*Primary Examiner* — Stephen T Gundry
(74) *Attorney, Agent, or Firm* — Wilmer Cutler Pickering Hale and Dorr LLP

(57) ABSTRACT

Method and system for providing access to information comprising the steps of receiving a request for information derived from data from a requester having one or more requester properties. Determining if the one or more requester properties meet one or more predetermined criteria associated with the data, if the one or more requester properties meet the predetermined criteria then providing the requested information to the requester. Storing data describing the request within a blockchain. In another aspect, there is provided a method and system for anonymizing data comprising the steps of at a first source of data determining one or more parameters of a procedure for dividing a first data set into subsets of data, such that each subset of data meets one or more criteria. Providing the parameters to a second source of data. At the second source of data amending the parameters such that the procedure will divide a second data set data into subsets of data that each meet the one or more criteria. Providing the first source of data with (Continued)

the amended parameters. At the first source of data dividing the first data set into subsets of data according to the procedure operating according to the amended parameters. At the second source of data dividing the second data set into subsets of data according to the procedure operating according to the amended parameters. Anonymising the subsets of data from the first source and the subsets of data at the second source. Combining the anonymized subsets of data.

18 Claims, 12 Drawing Sheets

(51) Int. Cl.
*G06F 18/211* (2023.01)
*G06F 18/23213* (2023.01)

(56) References Cited

U.S. PATENT DOCUMENTS

| | | | | |
|---|---|---|---|---|
| 2017/0364450 | A1* | 12/2017 | Struttmann | H04L 63/123 |
| 2018/0123779 | A1* | 5/2018 | Zhang | G06Q 20/02 |
| 2020/0372177 | A1* | 11/2020 | Cook | G06Q 30/06 |
| 2021/0226922 | A1* | 7/2021 | Cohen | H04L 63/0407 |
| 2021/0271686 | A1* | 9/2021 | Abdul Rasheed | G06F 11/1451 |
| 2022/0261717 | A1* | 8/2022 | Hecht | G06F 21/577 |
| 2022/0277103 | A1* | 9/2022 | Brannon | G06F 21/6245 |
| 2022/0284120 | A1* | 9/2022 | Cook | G06Q 20/027 |
| 2022/0309416 | A1* | 9/2022 | Barday | G06Q 10/067 |
| 2022/0350927 | A1* | 11/2022 | Brannon | G06F 21/6218 |
| 2022/0358427 | A1* | 11/2022 | Brannon | G06F 21/6245 |
| 2022/0391122 | A1* | 12/2022 | Gunasingam | G06F 3/0647 |
| 2023/0054446 | A1* | 2/2023 | LaFever | H04W 12/75 |
| 2023/0106409 | A1* | 4/2023 | Jones | G06F 21/604 |
| | | | | 726/26 |
| 2023/0132635 | A1* | 5/2023 | Cervantez | G06Q 20/4016 |
| | | | | 705/318 |

OTHER PUBLICATIONS

"K-means clustering" Wikipedia, Feb. 15, 2018. Retrieved from the Internet on Apr. 4, 2019 from (https://en.wikipedia.org/w/index.php?title=K-means_clustering&oldid=825776409). 11 pages.

International Search Report and Written Opinion dated Apr. 18, 2019, in the International Application No. PCT/GB2019/050557. 12 pages.

Jiang et al., "A secure distributed framework for achieving k-anonymity," The VLDB Journal, Aug. 5, 2006, vol. 15, pp. 316-333.

Swan, "Blockchain: Blueprint for a New Economy," O'Reilly, Feb. 8, 2015. ISBN: 978-1-4919-2049-7. pp. 1, 2, 16-17.

* cited by examiner

DATA SECURITY

CROSS-REFERENCE TO RELATED APPLICATIONS

This application is a U.S. national stage application of co-pending International Patent Application No. PCT/GB2019/050557, filed on Feb. 28, 2019, which claims priority to GB Patent Application No. 1803275.5, filed on Feb. 28, 2018, the disclosures of both of which are hereby incorporated herein by reference in their entireties.

FIELD OF THE INVENTION

The present invention relates to a system and method for securing data, enhancing data security and in particular, for storing and retrieving anonymized data recording, controlling access and providing an audit capability using a blockchain and a smart contract.

BACKGROUND OF THE INVENTION

Individual organisations collect, generate and collate large amounts of data in a variety of formats and for different purposes. When these data relate to customers and individuals, in particular, then strict requirements regarding data security and anonymity must be adhered to ensure that identifying information and personal details are not used in a way that adversely affects those individuals or breaches guidelines or legal requirements or other agreements.

Nevertheless, such data can have tremendous usefulness in diverse applications both within the organisation or entity that collects it and for others. For example, where data describes purchasing habits or travel preferences for particular segments of a market, then accurate predictions may be made about the success or otherwise of developing new outlets offering particular goods in a location. Large data sets may also be used to manage and plan other types of infrastructure such as power, transport and local amenities, for example. However, the types of data that can be collected in large quantities varies from business data to more technical data, such as traffic flows, energy usage and the use of facilities, etc.

Some organisations may collect and generate data that are useful for other organisations in very different fields. For example, energy companies may collect certain types of data about customer energy usage that could be useful to home developers or infrastructure builders, who may themselves hold data useful for energy suppliers. Therefore, synergies may exist between different organisations sharing information and data, especially regarding their customers. However, whilst a particular organisation may be content to share their data with other organisations that do not compete with them or operate in different fields, they may not wish to share their information with competitors or other organisations. There may be other reasons to restrict the usage of their data that are not necessarily business related. For example, some organisations or entities may only wish to share information with others that can prove their identity or have particular security clearance or levels.

Furthermore, the use of data within one organisation may be carefully managed and secured to avoid data breaches or personal information from being shared. It can be very difficult to ensure that such strict requirements are kept when data are shared between different organisations.

Privacy protection may be achieved to some extent by anonymizing data both within an organisation and before such data is shared with other organisations or entities. However, typical techniques for anonymizing data can degrade the usefulness of information for other organisations. For instance, one data set anonymized by one organisation may be difficult to combine or aggregate with another data set generated by a different organisation. Furthermore, it may be difficult to determine that another organisation has data that are potentially useful to a different organisation or to offer data for use by others. If control, anonymity and security of data cannot be maintained and it is difficult or inefficient to combine data sets then many data sharing opportunities can be lost.

"A Secure Distributed Framework for Achieving K-Anonymity" Wei Jiang and Chris Clifton; the VLDB Journal (2006) 15:316-333, describes using k-anonymization techniques to join separate data sets. However, this requires complex and computational intensive cryptographic techniques that may not be suitable for large data sets.

Therefore, there is required a method and system that overcomes these problems.

SUMMARY OF THE INVENTION

A consumer of data may define a particular question that requires the analysis of data or may request access to the data itself. The consumer of data or the requester may have particular properties that describe them or their type. These may include their fields of technology or business, their size, their nationality or location, previous requests or usage of data, security level, size, or other attributes. Suppliers or sources of data may define certain restrictions on the use of their data. In particular, these restrictions may be implemented by only allowing certain types of requesters from being granted access to their data or restricting the use of their data for particular purposes. A server or system may receive and process the request for the data and determine whether or not the criteria or restrictions are met for the particular request and/or requester. If the restrictions are satisfied, then the data are provided (either directly or indirectly) to the requester or the data are processed to answer a particular query posed by that requester. Different types of access may be provided. If the conditions are not met then the data or access to the data is not granted.

The request is stored within a blockchain together with information defining or describing the request. This information may include what they requested and information describing the requester. Therefore, suppliers or sources of information can determine what requests were made for their data and whether or not their criteria for granting access to the data were met so that they could be assured that their data is only provided when their particular criteria or conditions are met. The provision of data or information describing the access being granted to the requester may also be stored within the blockchain.

Preferably, the process of determining whether or not the conditions are met is implemented within a computerised transaction protocol that executes terms of a contract, which may also be described as a smart contract. Execution of this contract may also occur either within the same or within a separate blockchain. The blockchain may be replicated across nodes or over a network.

Similarly, a consumer of data may request conclusions or analysis derived from two or more sources of data, or more direct access to the underlying data from two or more sources. In this case, both data sources may have separate conditions or criteria for providing the data and both sets of conditions (or single conditions) may be checked or tested against the properties of the entity or individual requesting both (or more) sets of data. If either or both sets of criteria are met, then access to the requested data is provided by the separate sources (or information answering the query may be derived from the provided data). If only one set of criteria are met then only that source provides access to the data and data access to the other source may be refused or denied.

In all of these cases there may be a single criteria or two or more criteria for access and these may be updated as desired by the data providers. Again, the request, the requested data (preferably meta data or other token that identifies the requested data) and the data consumer or/or information describing these elements are stored within a blockchain.

When data are provided from two or more data sources then anonymization of the data may be required to ensure data security and that personal data rules are not breached. However, as non-anonymized data cannot or should not leave a particular organisation then it is undesirable for one data source to provide another data source with their non-anonymized data. This makes it difficult to anonymize separate data sets independently so that they may be used together. It is also undesirable for both or two or more data sources to provide their non-anonymized data to a third party for separate anonymization and provision to a data consumer or analysis.

One of the data providers may define a process or procedure for separating their data into subsets of data so that each subset meets one or more data criteria. For example, there may be a requirement that each subset of data has a minimum size or number of items. Should the size of each subset fall below a certain level then it may be possible to determine the identity or other properties of individuals or small groups of individuals within those data subsets. Each member within a subset may have one or more common attributes. These attributes may be generalised to form a level of anonymization. For example, whilst every individual in a subset has a yearly income that can be precisely defined, subsets may be based on ranges of income with the precise income for members removed or obscured to anonymize the data.

The scheme or procedure for dividing the data set into subsets may include parameters or an algorithm for division. It may be that a data set from a first data provider can be divided into data subsets that meet the criteria (e.g. having no particular subset below a certain size) but when the same procedure using the same parameters is applied to a data set from a second data provider then such conditions may not be met. The first data provider sends information describing their procedure or the parameters of such a procedure to the second data provider which tests the possible outcome of the procedure to determine if the resultant data subsets also meet the criteria. If they do not then the second data provider updates or amends the parameters and/or the procedure so that it does meet the requirements for its own data and data subsets (or at least improves or reduces the level of the breach) before sending back the updated procedure and/or parameters to the first data provider, which tests the updated parameters and/or procedure in its own data set.

If the amendments provide an outcome that no longer meets the requirements, then a further update or amendment may be made before sending back this information to the second data provider and so the process may repeat until both data providers are satisfied that operating the same procedure and parameters on their individual data sets result in subsets of data that meet the predetermined requirements. The process may loop or repeat a number of times but may be limited or the time that the process is allowed to repeat may be constrained. On agreement of parameters then each data set is divided into subsets of data that may each have particular properties. Because the same procedure was used to divide each data subset then the subsets of data should be compatible with each other. A similar process may be made with more than two data sources with the parameters and/or procedure being passed between the data sources until agreement is reached of a termination of the iterative process occurs.

Each data source anonymizes the data in the format of subsets of data each having particular properties before supplying the anonymized data to another entity or the requesting entity to be combined in its anonymized form. Combining the data may require combining corresponding data subsets (i.e. having the same attributes) but this can be achieved because the same process and process parameters were used in the original division of data into subsets of data.

The process may be repeated on subsets of data so that they themselves may be divided into smaller subsets according to the same or different parameters and criteria with each step, with the separate data sources reaching agreement that the procedure and/or parameters may be carried out whilst resulting in data subsets that still meet the overall requirement. The further division may be based on separate attributes. Alternatively, subsets may be divided by several attributes at the same time (e.g. yearly income—within £2000 and age range—within five years).

According to a further aspect, when data are provided by two or more data sources then anonymization of the data may be required to ensure data security and that personal data rules are not breached. Rather than exchanging parameters, as described above, both or all data sources may use the same or an agreed hierarchy structure or topology so that data sets can be combined completely. For example, this hierarchy may be based on geographic areas where sets of data from one data sources fit or are enclosed completely within geographic areas of another data source.

These separate aspects may be combined. For example, the procedure where data sources require that they only supply data to requesters having particular properties or conditions for two or more data sources may include the provision of data in a format anonymized according to the exchange of parameters between separate data sources or the use of the same data hierarchy (e.g. hierarchical clustering (where topology is shared between parties or data sources), to ensure compatibility of the anonymized data sets and subsets of data.

Preferably, the blockchain may take the form of allowing certain data to be permissioned. Such restrictions or conditions may include any one or more of:
a) Only approved entities can access the blockchain and/or are able to set up a node.
b) The blockchain may be encrypted and data suppliers or sources may only have cleartext access to blockchain records that pertain to them or their data (include who, who and when their data was requested and/or accessed or used). This may be achieved but such records being encrypted in a way that each data supplier has a unique decryption key only for their own records.
c) Data on the blockchain that is common to all participants may be available to all participants.
d) That a governing authority (e.g. a bank or other institution), or authorities such as a regulatory body, have cleartext access to all data or hold one or more decryption keys enabling this.

In accordance with a first aspect there is provided a method of providing access to information comprising the steps of:
- receiving a request for information derived from data from a requester having one or more requester properties;
- determining if the one or more requester properties meet one or more predetermined criteria associated with the data and/or a source of the data;
- if the one or more requester properties meet the predetermined criteria then providing the requested information to the requester; and
- storing data describing the request within a blockchain. The requested information derived from the data may be the data itself, the data reformatted or in a different form, analysis carried our using the data or any other derivatives from the data. The data describing the request may be a request identifier (e.g. with the details stored elsewhere), the nature of the request, a question or query defining the information, the requested data set, the identity, type or nature of the requester or any other information describing the request or combination of these items. Therefore, providers of data can more safely and securely grant access or otherwise control of their data more effectively whilst providing access more widely. In general the data may include information relating to individuals, customers, resource usage, utility data, demographic data, payment data, scientific information, environmental information, traffic flow, footfall, government data, survey or census data or any other data collected by one or more organisations or individuals.

Optionally, the data describing the request may be stored whether or not the one or more requester properties meet the predetermined criteria. Therefore, more accurate audit of the data control process may be achieved as both successful and unsuccessful requests, details of the requests and the requesters are stored for later analysis.

Optionally, determining if the one or more requester properties meet the one or more predetermined criteria associated with the requested data may be carried out within a computerised transaction protocol that executes terms of a contract. This may also be described as a smart contract or include a smart contract protocol. Therefore, the process of the request, and request validation may be automated in a more secure way with full records being stored removing doubt as to the criteria being met (or not met) for particular requests.

Preferably, the execution of the terms of the contract may occur within a blockchain. The smart contract may be stored with a blockchain and/or the execution of the terms may take place with the same blockchain.

Optionally, the one or more predetermined criteria may be set by a source of the requested data. Such conditions may be set up when the data are provided to the system and may be updated or revoked at any subsequent time. The conditions may include restrictions on which entities can have access to their data, how the data are used, when they are used, how often they are used, which classes, categories or types of customer or requester can use the data (including how often), when, how and if data from one source may be used with data from another source and any combination of these conditions. Some conditions may be based on the requester themselves but other may be common to all requesters, for example. Other conditions may be applied. One or more criteria may be set, used or imposed by each data provider or source. Other criteria may be common to groups of or all data sources.

Optionally, the requested information is derived from two or more sources of data, and wherein the predetermined criteria are separately set by each source of the data. This improves the flexibility of the system.

Optionally, the method may further comprise the step of aggregating the data from the two or more data sources before providing the requested information to the requester. Therefore, the data may require less processing by the requester. It may also appear to come from a single source when it originated from a plurality of sources. The requester may or may not be provided with the identity of the source or sources. Other processing of the data may occur before is it is provided to a requester.

Optionally, the method may further comprise the step of anonymizing the data before providing the requested information to the requester. This helps protect the subjects of the data.

Optionally, the method may further comprise the step of retrieving data from a data store before providing the requested information to the requester. The data may be stored in various formats and locations, for example. Preferably, the data may be stored at the data source. The data and/or information derived from the data may pass through different servers and one or more networks before it is provided to the requester (in a raw or original format or otherwise processed or analysed).

Optionally, the requested information may be data analytics, data analysis results or other derivative data or information from the original data, the method may further comprise the step of processing the retrieved data to generate data analysis results before providing the data analysis results to the requester.

Preferably, the data analytics may be stored for future retrieval. Therefore, the same or similar requests for data may be met more efficiently. The stored analysis results may be securely deleted at a particular time (or after expiry of a period) or immediately.

Optionally, the method may further comprise the step of determining from the blockchain that information was only provided to a requester having properties that met the predetermined criteria. This provides audit or checking capability to the system and any data sources. The requester may be rejected if it has properties that do not meet the criteria. Different step of the process or method may be recorded in the blockchain with a particular hash or identifier so the steps and time frame can be derived later.

According to a second aspect, there is provided a method for anonymizing data comprising the steps of:
- at a first source of data determining one or more parameters of a procedure for dividing a first data set into subsets of data, such that each subset of data meets one or more criteria;
- providing the parameters to a second source of data;
- at the second source of data amending the parameters such that the procedure will divide a second data set data into subsets of data that each meet the one or more criteria;
- providing the first source of data with the amended parameters;
- at the first source of data dividing the first data set into subsets of data according to the procedure operating according to the amended parameters;

at the second source of data dividing the second data set into subsets of data according to the procedure operating according to the amended parameters;

anonymizing the subsets of data from the first source and the subsets of data at the second source; and combining the anonymized subsets of data. Therefore, more complex or detailed requests for data may be accommodated and the quality and breadth of the data may be improved, whilst the subjects of the data (or those entities collecting the data) do not lose control of their personal information.

Optionally, each subset of data may have one or more attributes and the step of combining the anonymized subsets of data further comprises: combining each of the subsets of data from the first source with a subset of data from the second source having one or more corresponding attributes. Therefore, the usefulness of the requested data may be improved as it can be treated, analysed or processed as if it originated from a single source. Furthermore, any deficiencies (e.g. a low number of members) in one data set from one source may be mitigated by the other source or sources.

Optionally, the procedure may be a clustering algorithm. Preferably, the clustering algorithm is k-means clustering. Other clustering algorithms may be used. For example, hierarchical clustering may be used (where topology may be shared between parties or the two or more data sources).

Optionally, the one or more criteria may include a requirement for a minimum number of items in each subset of data.

Optionally, the one or more parameters are amended and exchanged until the one or more criteria are met for both data sources. In other words, the method may loop or repeat with each data source updating or amending the parameters that they receive from the other one (or more data sources) so that either the criteria are met or at least they are changed so that the agreement with the criteria is improved (i.e. they get closer to the conditions of the criteria).

Optionally, before anonymizing and combining the anonymized subsets of data, the method may further comprise dividing each subset of data by:

at the first source of data determining one or more further parameters of a procedure for dividing a first data set into subsets of data, such that each subset of data meets one or more criteria;

providing the further parameters to the second source of data;

at the second source of data amending the further parameters such that the procedure will divide a second data set data into subsets of data that each meet the one or more criteria;

providing the first source of data with the amended further parameters;

at the first source of data dividing the first data set into subsets of data according to the procedure operating according to the amended further parameters; and at the second source of data dividing the second data set into subsets of data according to the procedure operating according to the amended parameters.

Optionally, providing the amended parameters to the first and second sources repeats for a predetermined time and/or number of iterations. Other limits may be placed on the iteration step of phase of the method.

In accordance with a third aspect, there is provided a method of providing information derived from data from at least two (or more) sources, the method comprising the steps of:

receiving a request for information derived from a requester having one or more requester properties, wherein the requested data is derived from data from a first source and a second source;

determining if the one or more requester properties meet one or more predetermined criteria defined by the first source;

determining if the one or more requester properties meet one or more predetermined criteria defined by the second source;

if the one or more requester properties meet the predetermined criteria defined by the first source then providing the requested information derived from data from the first source to the requester;

if the one or more requester properties meet the predetermined criteria defined by the second source then providing the requested information derived from data from the second source to the requester; and storing data describing the request within a blockchain. The data describing the request may include the requested data and the requester (or properties of the requester). Therefore, the data from two (or more) sources may be provided to a requester (or a response may be derived from such data) making a single request.

Optionally, before the requested information derived from the data is provided from the first source and the second source, the data from both the first source and the second source may be anonymized at their respective sources and combined. The data may be combined at either or both (or more) sources or by another entity.

Optionally, the data may be anonymized and combined by:

at the first source determining one or more parameters of a procedure for dividing a first data set into subsets of data, such that each subset of data meets one or more data criteria;

providing the parameters to the second source;

at the second source amending the parameters such that the procedure will divide a second data set data into subsets of data that each meet the one or more data criteria;

providing the first source of data with the amended parameters;

at the first source dividing the first data set into subsets of data according to the procedure operating according to the amended parameters;

at the second source dividing the second data set into subsets of data according to the procedure operating according to the amended parameters;

anonymizing the subsets of data from the first source and the subsets of data at the second source; and combining the anonymized subsets of data. The one or more parameters may be attributes, limits, conditions, properties of the resultant subsets, restrictions, algorithms, or other items to define how the procedure operates or executes. Subsets with similar or the same attribute(s) (e.g. pairs of subsets, or more when there is more than two sources) may be combined to form a new, larger, combined subset. This may occur until each subset from each source is combined with one or more subsets from another source or sources. This provides further benefits in that consumers of information can use data that may contain personal information of individuals (for example) or other sensitive data, in a way that does not compromise security or data protection requirements, whilst improving the breadth and scope of the data. This is because the data may be originally acquired from multiple sources.

Preferably, each subset of data has one or more attributes and the step of combining the anonymized subsets of data further comprises: combining each of the subsets of data from the first source with a subset of data from the second source having one or more corresponding attributes.

Preferably, the procedure may be a clustering algorithm.

Optionally, the clustering algorithm is k-means clustering.

Optionally, the one or more data criteria include requirement for a minimum number of items in each subset of data.

Optionally, the one or more parameters are amended and exchanged until the one or more data criteria are met for both data sources.

In accordance with a fourth aspect, there is provided a system comprising:
  at least one processor; and
  at least one memory storing computer-readable instructions that, when executed by the at least one processor, cause the system to perform:
    to receive a request for information derived from data from a requester having one or more requester properties;
    determining if the one or more requester properties meet one or more predetermined criteria associated with the data;
    if the one or more requester properties meet the predetermined criteria then providing the requested information to the requester; and
  storing data describing the request within a blockchain.
  Similarly, the stored data may describe the requested data, the requester or any parameters or attributes of the requester.

In accordance with a fifth aspect, there is provided a system comprising:
  at least one processor; and
  at least one memory storing computer-readable instructions that, when executed by the at least one processor, cause the system to perform:
    at a first source of data determining one or more parameters of a procedure for dividing a first data set into subsets of data, such that each subset of data meets one or more criteria;
    providing the parameters to a second source of data;
    at the second source of data amending the parameters such that the procedure will divide a second data set data into subsets of data that each meet the one or more criteria;
    providing the first source of data with the amended parameters;
    at the first source of data dividing the first data set into subsets of data according to the procedure operating according to the amended parameters;
    at the second source of data dividing the second data set into subsets of data according to the procedure operating according to the amended parameters;
    anonymizing the subsets of data from the first source and the subsets of data at the second source; and
    combining the anonymized subsets of data.

In accordance with a sixth aspect, there is provided a system comprising:
  at least one processor; and
  at least one memory storing computer-readable instructions that, when executed by the at least one processor, cause the system to perform:
    receiving a request for information derived from data from a requester having one or more requester properties, wherein the requested information is derived from data from a first source and a second source;
    determining if the one or more requester properties meet one or more predetermined criteria defined by the first source;
    determining if the one or more requester properties meet one or more predetermined criteria defined by the second source;
    if the one or more requester properties meet the predetermined criteria defined by the first source then providing the requested information derived from data from the first source to the requester;
    if the one or more requester properties meet the predetermined criteria defined by the second source then providing the requested information derived from data from the second source to the requester; and
    storing data describing the request, the requested data and the requester within a blockchain.

In the event that one or more requests do not meet the predetermined criteria or condition(s) then one or more further actions can occur. For example, if a request is rejected then this event may also be stored within the blockchain. Information that is stored and describes this event may include details of the request (similar to those of successful requests) together with the cause of the rejection or an identifier of such a cause. When a request requires more than one data source then one or more of the data sources may reject the request while others may approve or grant it (based on the system evaluating the request against the criteria or conditions). The method and system may then carry out a determination to decide if the overall request can still go ahead (with the limited data) or not and record such decisions as appropriate on the blockchain. Again, information regarding when, how and who rejected (or approved) the access and reasons for refusal may be included in the blockchain.

Optionally, before the requested information derived from the first source and the second source is provided, the data from both the first source and the second source are anonymized at their respective sources and combined.

Optionally, the data are anonymized and combined by:
  at the first source determining one or more parameters of a procedure for dividing a first data set into subsets of data, such that each subset of data meets one or more data criteria;
  providing the parameters to the second source;
  at the second source amending the parameters such that the procedure will divide a second data set data into subsets of data that each meet the one or more data criteria;
  providing the first source of data with the amended parameters;
  at the first source dividing the first data set into subsets of data according to the procedure operating according to the amended parameters;
  at the second source dividing the second data set into subsets of data according to the procedure operating according to the amended parameters;
  anonymizing the subsets of data from the first source and the subsets of data at the second source; and
  combining the anonymized subsets of data.

According to a seventh aspect, there is provided a method for anonymizing data comprising the steps of:
  obtaining a first data set at a first data source;
  obtaining a second data set at a second data source, wherein the first data set and the second data set partitioned according to the same hierarchical topology;

anonymizing the subsets of data from the first source and the subsets of data at the second source; and combining the anonymized subsets of data. Preferably, the hierarchical topology is a geographical topology.

The methods described above may be implemented as a computer program comprising program instructions to operate a computer. The computer program may be stored on a computer-readable medium or transmitted as a signal, for example.

The computer system may include a processor or processors (e.g. local, virtual or cloud-based) such as a Central Processing unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature and aspect described above may be used with any particular aspect or embodiment of the invention. Individual features may be combined and taken from different aspects.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
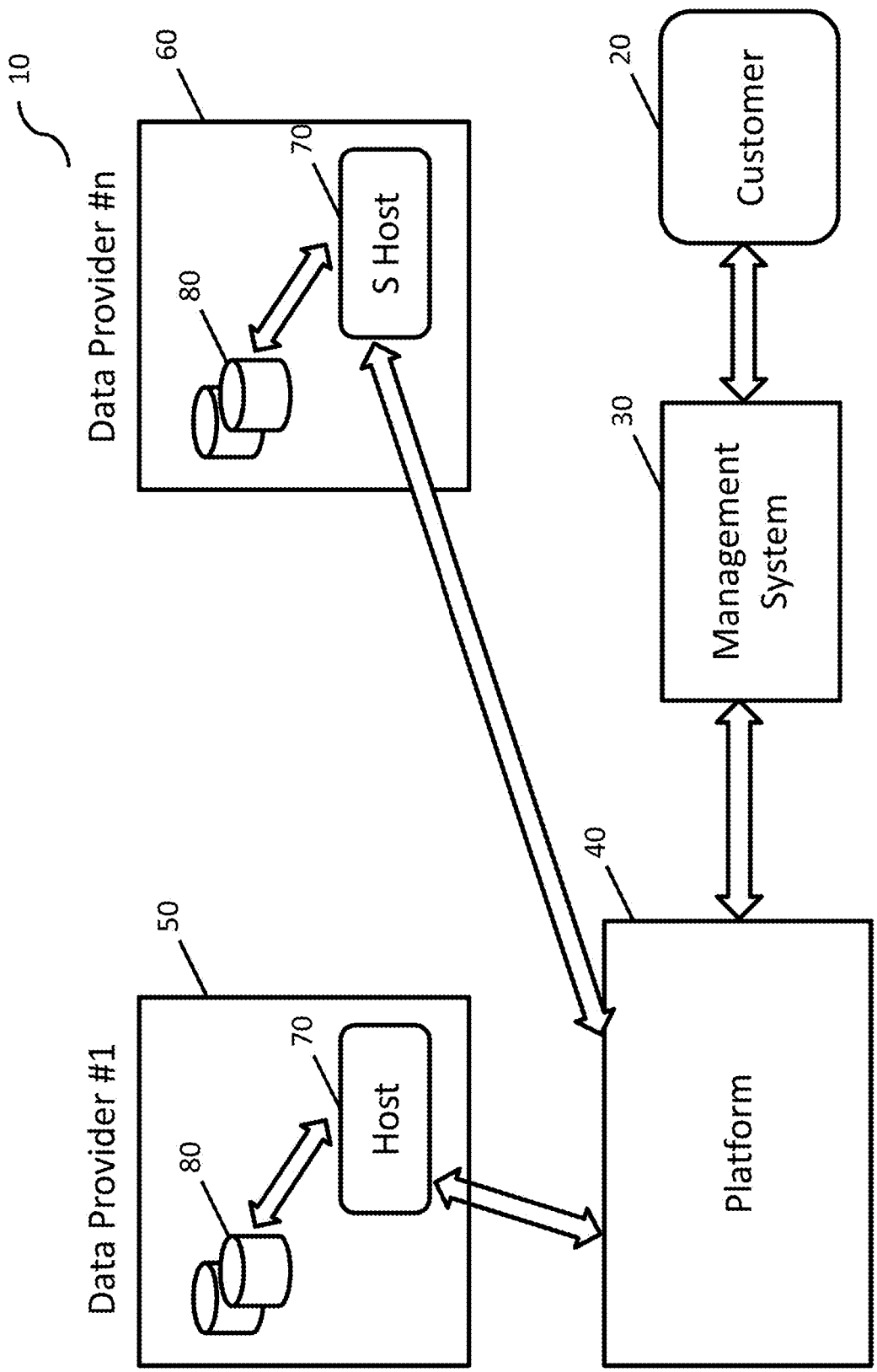
FIG. 1 shows a schematic diagram of a system for providing access to data, given by way of example only.

The following scenarios indicate examples for the use of data within a system that will be described below. In particular, these scenarios demonstrate how providing access to data from one more organisations can be beneficial.

As a first example, an automotive manufacturer wants to introduce something completely new: A pay-per-mile driverless car product. Search engines and taxi companies in this field may be competitors, so they aren't going to provide the necessary data. Understanding of all of the classic business plan parameters is required: the size of the market; pricing; capacity; location, etc.

Understanding why people travel is necessary. It may be that people driving to work will pay more but will be less flexible over time. It may be that people going shopping will be more flexible over time, but will primarily do so on the weekends. They will be willing to pay less because they could always shop on the internet. In the evening people travelling to the cinema may pay less than people going to the opera, but there are more of them.

Combining bank data with telecoms provider data can be particularly useful in this scenario. These data can indicate how people are moving and what they are buying. Patterns of behaviour may become apparent to understand how flexible they are and to estimate the value that they put on each activity.

As a second example, an insurance company has a suite of two travel insurance products, a Winter Sports policy and a Standard policy. They would like to introduce more products, perhaps an older traveller policy, a premium policy or a family policy.

The company has been providing this cover for a while and so knows the existing products well but is faced with a significant information gap: they only ever see what customers claim, they don't see what they care about. They understand costs in terms of pay-outs, but they don't understand what people value, which is driven by what they do, or intend to do when they travel. They also suffer from Travel Insurance being a low-engagement product. Travel insurance is often purchased as an add-on and at the last minute, so it is difficult to ask consumers directly about what they would need.

Bank data may track what people do when they travel, and if it were to be combined with telecoms provider data, then this may inform them where they go when they travel. The company could then start to segment customers by what they actually do rather than by what they claim for.

The system enables separate data sources to provide the ability to answer such question in a secure manner.

Certain processes and procedures or methods take place within a system 10 for managing data. The following description describes an example implementation of such a system including various components that carry out certain functions of the method. In other examples, different parts of the method and procedure are carried out by different components of the system 10.

In one example implementation, data producers, the system and data consumers or customers, can use a web application to process data insight or analysis requests by storing data governance actions on a blockchain network.

An interface enables transactions (e.g. requests and offers of data) to be processed. The interface facilitates the usage of blockchain technology (i.e. writing of transactions) to record each stage of the process.

In one example, a data requester or customer (e.g. a property developer) may wish to know how many people visit a particular high street area and how many of them purchase fast food when there. The customer may not have access to such information but other entities or data sources may have useful data even though they operate in different fields. The system 10 may provide a report based on anonymized data derived from the data sources. In the case that a plurality of data sources each have relevant data that may contain personal information (e.g. when, where and how individuals purchase fast food) then it is difficult to consolidate different data sets even though the report may be improved by obtaining more data. The system 10 only pulls data from each data source when it is required for a particular analysis, which reduces the amount of data that needs to be stored within the system 10 and at any one time. After the report has been delivered, it may be deleted or removed from the system 10.

Whilst data providers may be willing and even keen to share their data, they may place restrictions on this sharing and in particular, to who receives information derived from their data and how it will be used. Rather than rely on trust-based systems to achieve this, a smart contract imposes such conditions automatically and securely. The queries, outcomes and results are stored within a blockchain to provide assurance to the data providers that their data is only being used according to the conditions that they have placed on its use. Furthermore, other data sources may impose different conditions for their own data that may be combined with other data sources to form a single report or response to a request, without any third party (including different data sources) having plain text access to the underlying data.

Data provided by the different sources (once anonymized), may be provided to the system using various interfaces, such as an application programming interface (API), CSV file or PDF file, for example.

Cloud infrastructure may be used to enable the system to scale efficiently. Each analysis report or insight may be stored within containers or separate environments to prevent data leakage. Therefore, if the same data were to be used for different reports then it would need to be uploaded again. Once the reports are complete and made available to the customer then the data within those containers may be permanently deleted, either immediately or after a certain time has elapsed.

Data minimisation may be achieved by predicting the suitability of data sources to meet particular requests based on information describing the data provided by each data source (e.g. using JSON information provided by the data sources or third parties). The tracking of the status and events from data ingestion to project tear-down or deletion may be tracked as events committed to the blockchain.

FIG. 1 shows a schematic diagram of the system 10 for providing access to anonymized data from different data providers or sources of data. FIG. 1 shows two sources of data but there may be any number of sources (e.g. three, four, five, six, etc.). A customer 20 may require access to data or analysis generated from those data originating from and provided by the different data sources. The customer 20 interfaces with a management system 30 (e.g. by web interface and/or API) by setting up an account or other procedure in which their details are stored. Furthermore, the management system 30 receives data requests from the customer 20 for data provided by the various data sources.

Platform 40 processes such requests according to the method described in the following passages. In summary, the platform 40 extracts information from the requests and determines whether those requests meet certain criteria for accessing data provided by data sources 50 and 60. Platform 40 is also in communication with hosts 70 within one or more data sources 50 and 60. The data within each data source 50, 60 are stored within one or more databases 80. In this example implementation, these data do not leave the data sources 50, 60 except after anonymization.

It is noted that FIG. 1 is shown as a high-level component diagram only and operates across one or more networks. Each data source may include its own processor or server, which mediates between the platform 40 and databases 80. In this example implementation, the host includes a secure interface to the platform 40 and a secure interface with its own one or more databases 80. The host 70 also carries out data anonymization and aggregation functionality, which will be discussed later. A further auditing, blockchain and smart contract interface (not shown in this figure) is also included in the host 70.

The platform 40 includes corresponding secure interfaces to the hosts 70 and, management system 30 and/or databases 80. The platform 40 also includes secure data storage, a data management ingestion and analytics layer, insights or analysis generation and publication layers, and a blockchain and smart contract interface. The blockchain may be stored within nodes (preferably more than one) to ensure that the data stored in the blockchain can be verified independently. The management system 30 may be a logical component that may or may not be embedded within the platform 40 and also contains a secure interface to the platform 40, a data science interface, query generation and data management interfaces, insight, analysis and distribution functions, to enable such information to be provided to the customer 20. A customer interface that may include management and billing functions, and a blockchain and smart contract management function is also provided. The arrows between the components indicate communications and exchanges of information between those components. Such communication may be achieved following agreements and terms and conditions, encryption, access management, auditing and/or business logic restrictions.

A customer 20 may operate an interface or client that includes an interface to the management system 30. This interface may include functionality enabling the definition of a query or other requested analysis or insights into the data, the ability to receive and consume such analysis, manage the relationship with the management system by updating and managing their own account information, and an accounts component that enables the customer 20 to receive invoices and make payments.

FIGS. 2 to 7 show sequence diagrams or "swim-lane" diagrams indicating the flow of information and communications between the various components of the system 10. Again, the methods and individual steps and ordering of the steps is provided as an example only and different components or a combination of components may carry out these steps in the described order and manner or in a different way.

These figures all include the same components which are the customer 20, the management system 30, the platform 40, a data source host 70, a data source 50, a smart contract 100, and a blockchain 110. Common components are provided with the same reference numerals. More than one data source may be used with the same process applying to each data source or sources.

Figure 2:
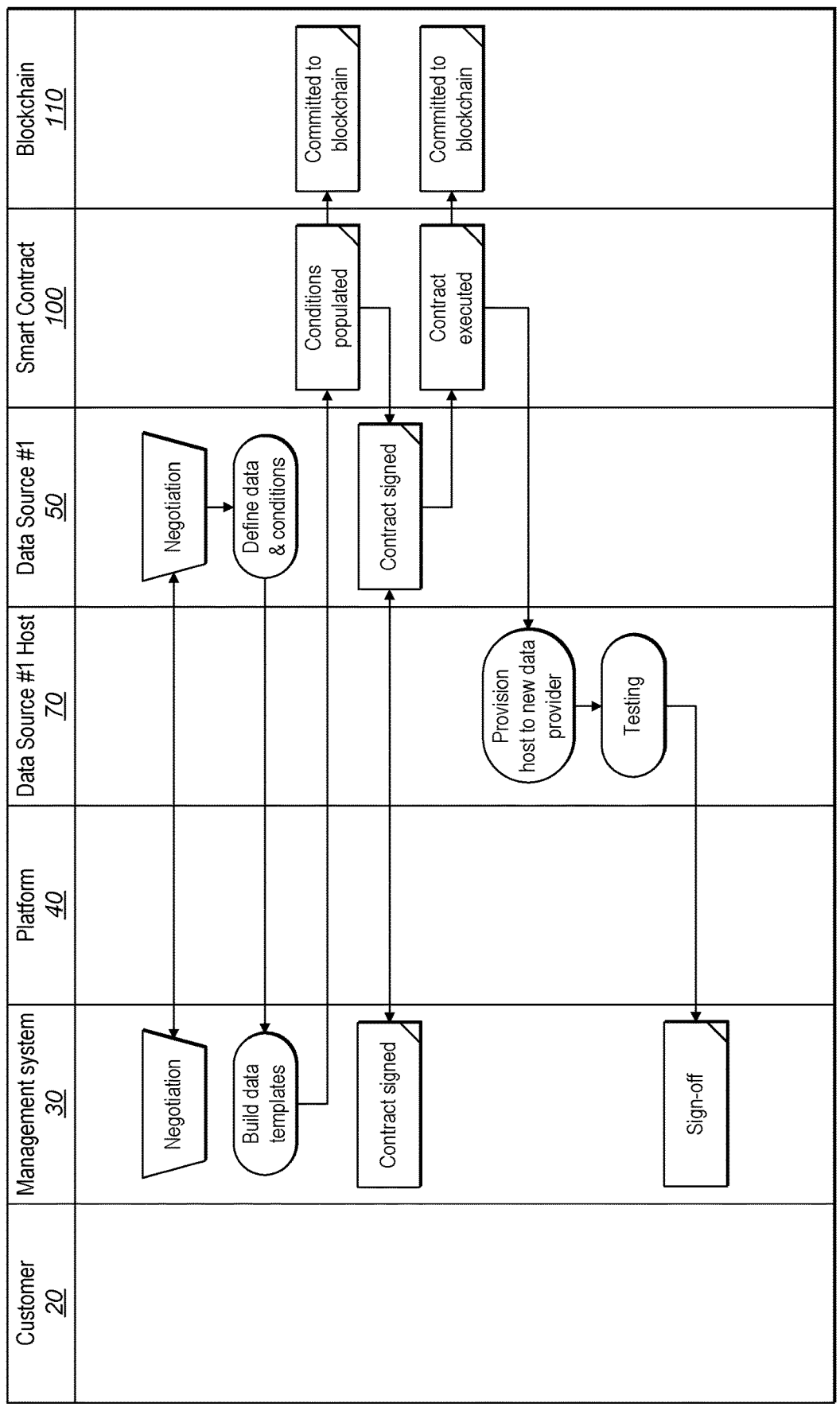
FIG. 2 shows a sequence diagram including steps of a method for adding a data source to the system of FIG. 1.

The steps shown in FIG. 2 illustrate how a data source or provider 50 is added to the system or how an existing data source 50 adds a new set of data. A negotiation process occurs between the data source 50 and the management system 30. This process determines what data are being offered by the data source 50 and what conditions (if any) are applied to the data that it is supplying. These conditions may include conditions on the types and particular entities or customers 20 that may have access to the particular data set, conditions regarding the availability of the data at particular times or if particular customers 20 can access the data whenever they require, or only on particular occasions or a limited numbers of times, or any other condition that they may define at this stage. The management system takes these conditions and builds a data template so that the conditions can be implemented within a smart contract 100. This data template is sent to the smart contract component to populate the conditions within a particular area that uses a computerised transaction protocol to execute the terms of the newly defined smart contract 100. The system 10 may include a particular smart contract 100 for every data source or data set provided by each data source 50.

The conditions implemented within the smart contract 100 are committed to a blockchain 110 that acts an effective store of the contract terms and conditions in a format that cannot be changed or updated without such updates being apparent from anyone with access to the blockchain 110. Once finalised, the smart contract 100 may be signed electronically and securely by the data source 50. The smart contract 100 is then executed and the execution of the smart contract 100 is again committed to the blockchain 110. The host 70 within the data source 50 is provisioned for the new data source 70 and the host also tests the provisioning of data to ensure that data may be accessed where requests meet the conditions stored and validated within the smart contract 100. The management system 30 signs off this testing process, which finalises the implementation of the data source 50 or a new data set within the data source 50.

Figure 3:
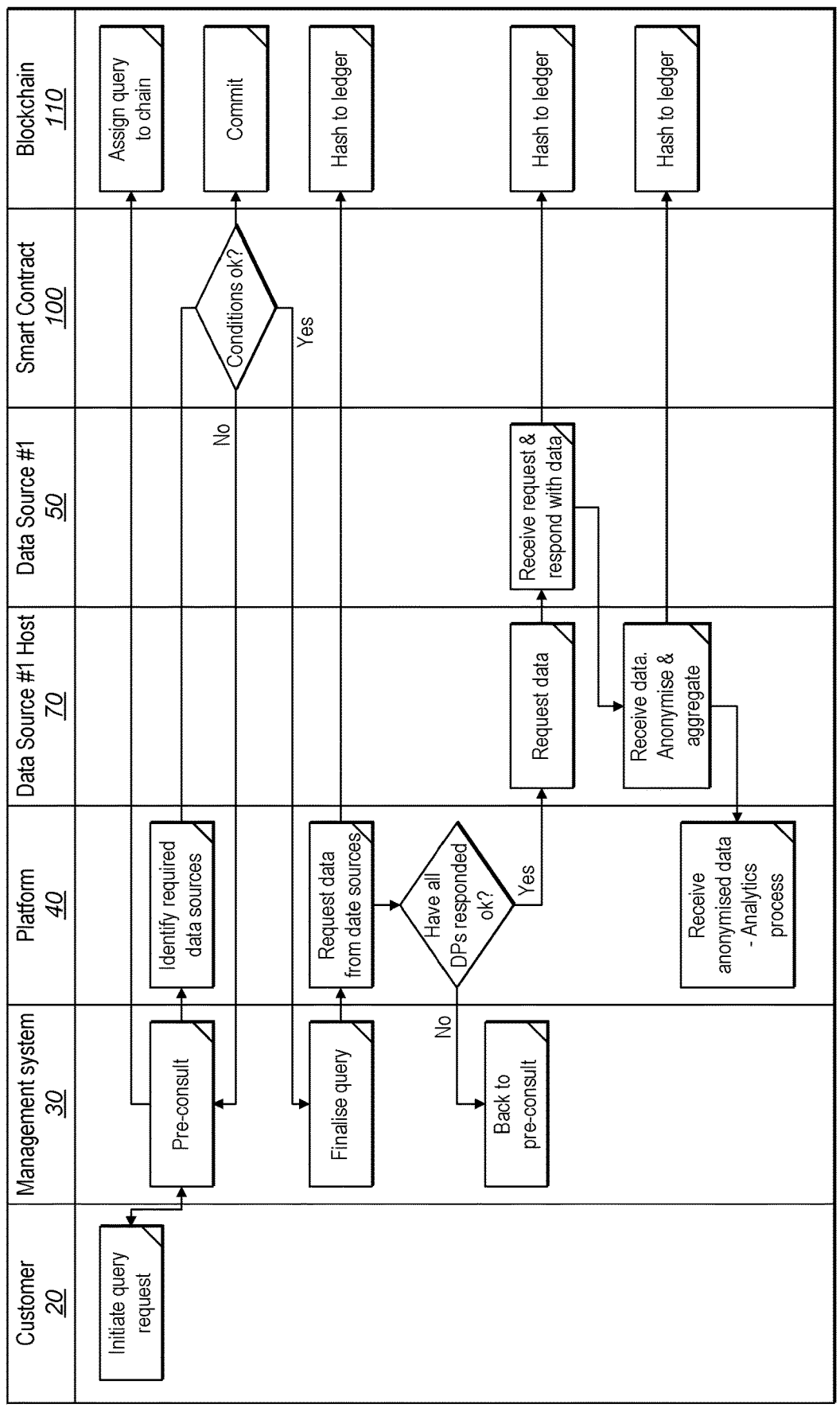
FIG. 3 shows a sequence diagram including steps of a method for processing a request for data from the system of FIG. 1.

FIG. 3 shows a sequence diagram of a method for a customer to define a query or request for data from one or more data sources 50. Whilst the process defined with reference to FIG. 2 did not include the customer 20, now the customer 20 initiates a query request, which is sent to the management system 30, which carries out a pre-consult step to ensure that the query can be processed. Even at this early stage, the request and details of the request including the requesting customer 20 are stored within the blockchain 110. Committing to the blockchain 110 may include hashing the request. These steps occur before any data is made available to the customer 20. The platform 40 receives details of the request and identifies one or more data sources 50 that may be used to meet such a request. Specific data sources may be identified within the request or the management system may find them based on the query.

The request may include reference to a particular data source 50 or may include details of the requested data that are used by the platform 40 to determine which particular data sources should be queried. Once the platform 40 has identified a particular data source that may form the basis of the response, then query parameters including one or more requester properties (e.g. their identifier or type) are sent to the smart contract 100 to determine whether the conditions or predetermined criteria associated with the requested data (or information derived from the data) are met. In this example, information describing the particular checks and conditions being met is stored within the blockchain 110. If the conditions are not met then a response is sent to the management system 30 that may amend or reject the query. This outcome may be notified to the customer 20. This procedure may loop or iterate until the smart contract 110 accepts the conditions or rejects them (e.g. after a predetermined number of attempts).

For successful smart contract approval, the query is finalised within the management system 30. The platform 40 then prepares a request for the data from the data sources and sends this to each data source 50. Whilst FIGS. 2 to 7 only show a single data source 50, where the management system identified more than one possible data source then the steps involving data source 50 are duplicated for further sources. Each data source 50 then responds with the requested data. The request is handled by the host 70, which receives the data from one or more internal databases 80, anonymizes the data and aggregates it with any other data from other data sources 50 before returning it to the platform 40.

Whilst FIG. 3 includes an anonymization and aggregation step, it should be noted that the method may proceed without these steps and still retain advantages, including the ability to control data more effectively. Aggregation is particularly useful if more than one data source is used or identified for a particular query. Anonymisation may take place using any suitable method but one particularly advantageous anonymization technique is discussed with reference to FIGS. 9 and 10 below.

If a particular data source 50 (or a single data source when there is only one being queried) does not respond to the request then the management system 30 may need to return to a pre-consult phase to either remove the data from being marked as offered or determine if further conditions need to be met before the data source 50 releases access to the data. At the request stage and again at the anonymization and aggregation stage, the blockchain 110 is updated.

Figure 4:
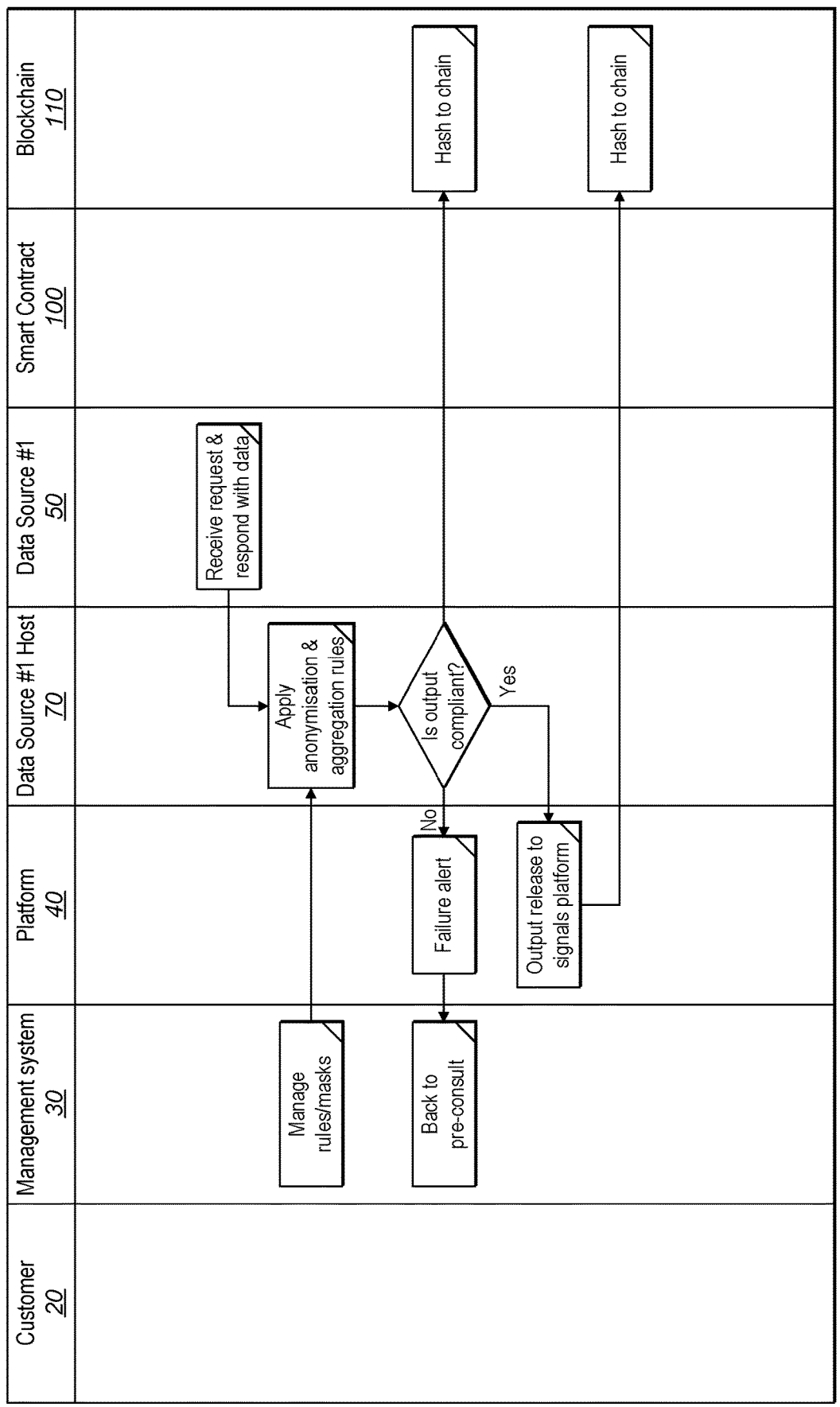
FIG. 4 shows a sequence diagram including method steps for anonymizing and aggregating data within the system of FIG. 1.
Figure 5:
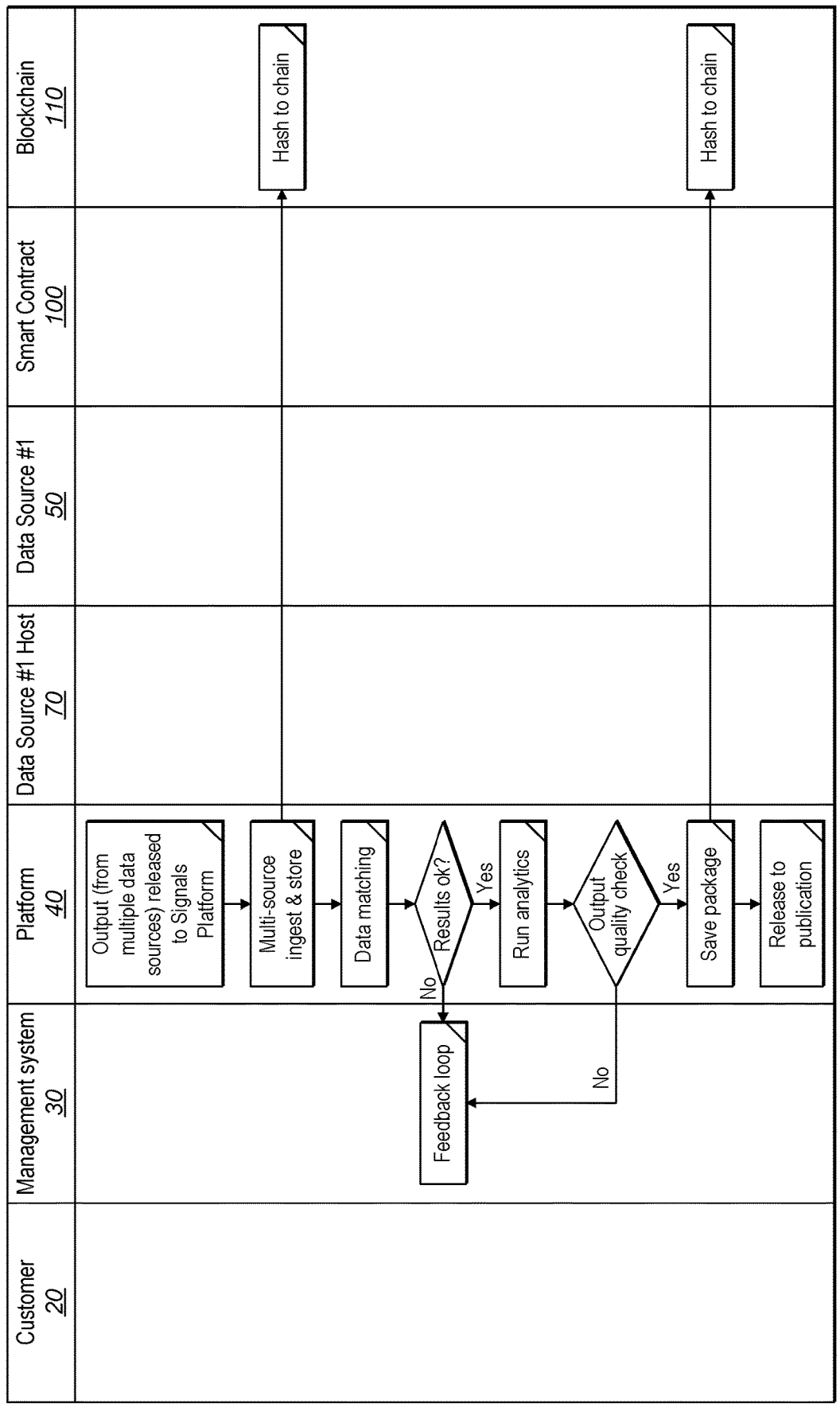
FIG. 5 shows a sequence diagram including method steps for analysing data within the system of FIG. 1.

FIG. 4 shows a sequence diagram of procedure for anonymizing the data provided by each data source 50 and aggregating or combining data sets if more than one data source 50 is used to meet the customer's request for information. Data may also be aggregated between different data sets within a single data source 50.

The management system 30 manages any anonymization and aggregation rules, which are applied by the host 70, following the data being provided from the database 80. The anonymization and aggregation steps are applied within data source 50 so that no non-anonymized data leaves the data source 50, ensuring personal and private information of the originating data is not lost or leaves a particular organisation. Within the host 70 the resultant anonymized and aggregated data are tested to determine whether they are compliant with particular rules and requirements. If the data are compliant then they are released to the platform 40 and this event is also added or committed to the blockchain 110. If the data cannot be made compliant then a failure alert is sent to the platform 40, which returns back to the management system 30 with an instruction to return to the pre-consult phase. The release of data in the anonymized and aggregated format from the data source 50 to the platform 40 creates a further event that is added to the blockchain 110.

Where the customer 20 requires analysis or insights into questions or queries being asked rather than direct access to the data itself then such analysis is performed by the platform 40. This procedure starts with obtaining data from one or more data sources 50 that are released to the platform 40 as described in the reference to FIG. 4. These data are temporarily stored and the storage of these data is an event that is also added to the blockchain 110. Data matching is carried out by the platform 40 and where results are determined to be successful then the particular requested analysis is carried out. If not, then the procedure loops until the results are successful. Once the analysis is carried out, a quality check is made, which if passed enables a package of the information to be saved and this event is also saved to the blockchain 110. The package is then released for publication according to the procedure described with referenced to FIG. 6 that follows.

Figure 6:
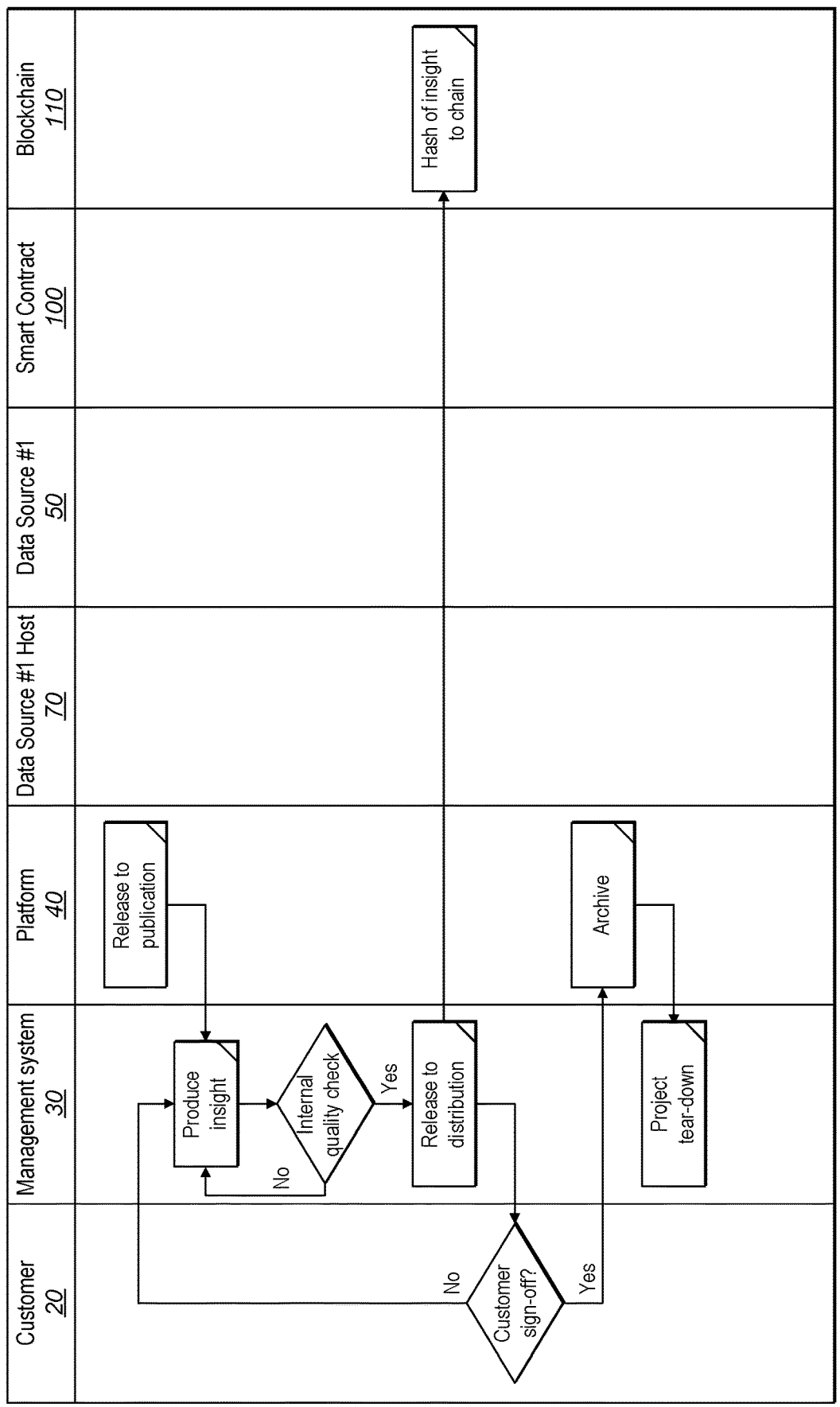
FIG. 6 shows a sequence diagram including method steps for storing the analysis generated from the method of FIG. 5.

FIG. 6 shows a portion of the method that starts with the step of platform 40 releasing the package for publication to the management system 30, which itself carries out a quality check. If passed the package is released for distribution. This event is saved to the blockchain 110. Then customer 20 has the option to sign off the released package analytics if acceptable and if not then further steps may be taken by the management system 30 until sign off by the customer 20 is achieved. The platform 40 archives the released package and the project may be completed by the management system 30 either now or at a later stage.

Figure 7:
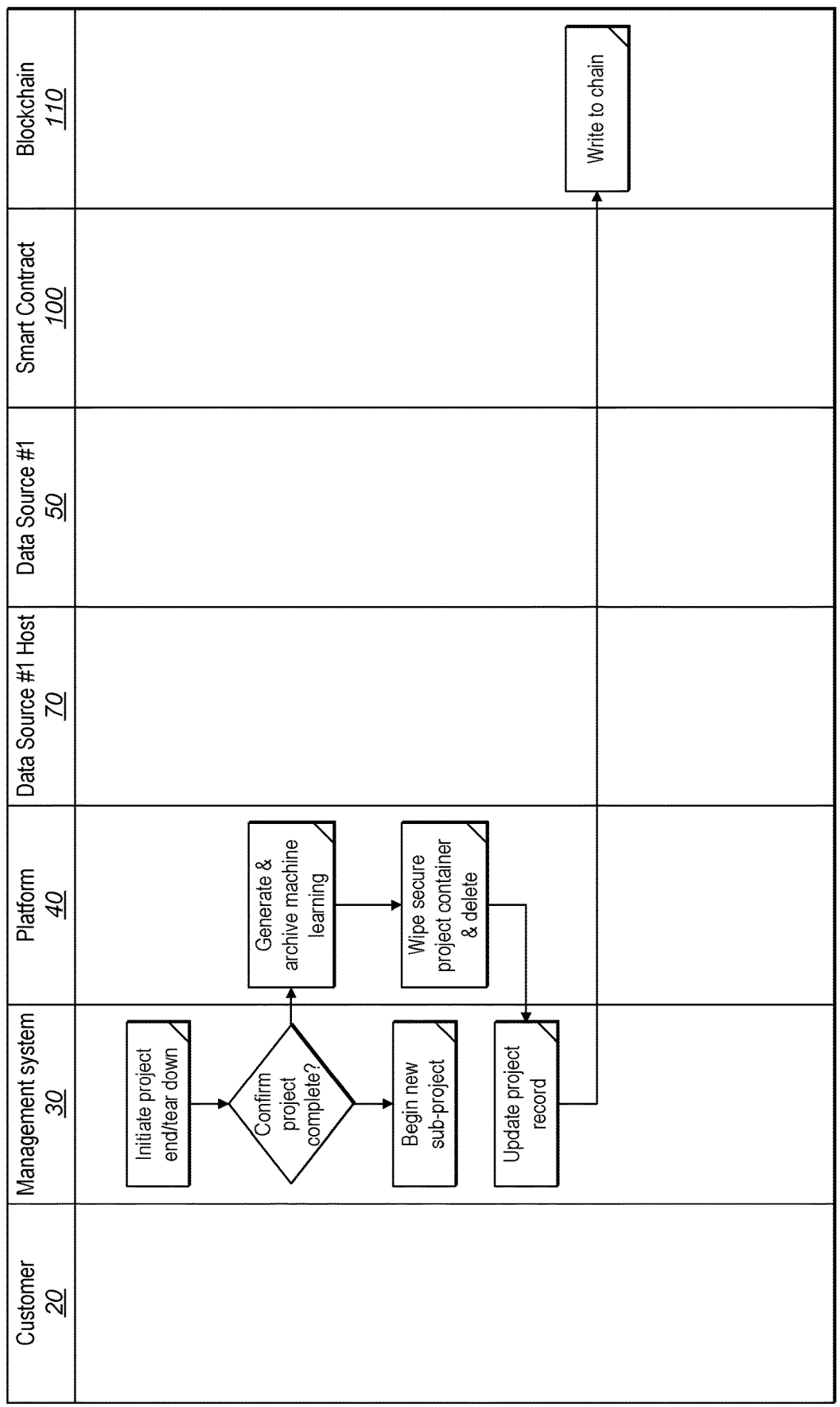
FIG. 7 shows a sequence diagram including method steps for processing the stored analysis generated from the method of FIG. 5.

FIG. 7 describes the process for completing a particular project or project teardown, which is achieved between the management system 30 and the platform 40. Once the management system confirms that the project is complete then any archiving may be carried out by the platform system, which may include machine learning techniques to improve the analysis process. The different instances of saved data within the platform 40 is securely wiped and deleted with the management system 30, updating a project record status showing that this has been completed. This step is stored within the blockchain 110. In some instances, the management system 30 may continue with a project if it is not complete, which may begin a new subproject providing further analysis or data output to the customer 20.

Figure 8:
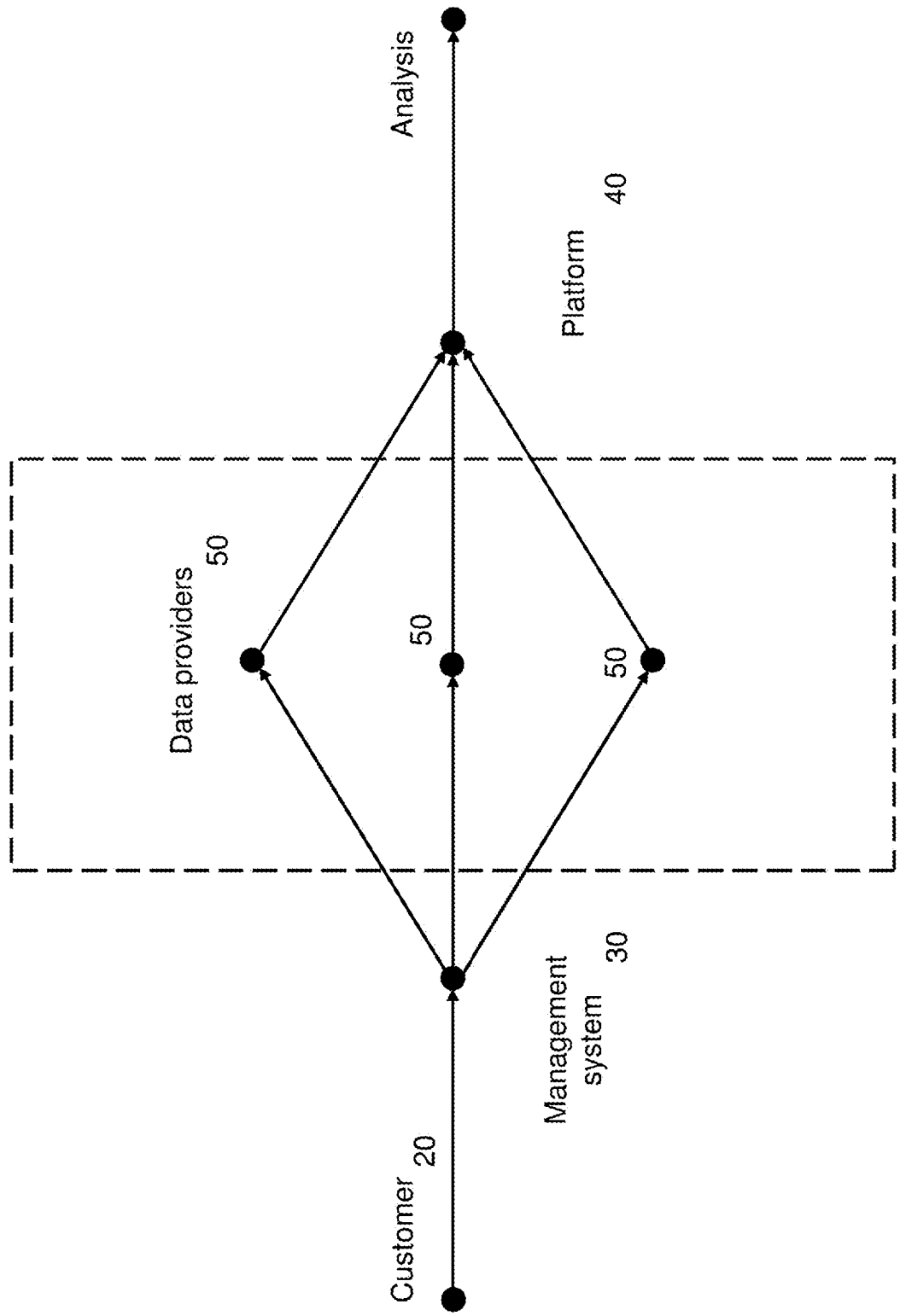
FIG. 8 shows a schematic diagram of the data flow through the system of FIG. 1.

FIG. 8 shows a high level schematic diagram of the process of the system 10 responding to a request from a customer 20 for information that may be derived from a plurality of data sets that come from data providers 50. The management system 30 processes this request, as described with reference to the previous figures and the platform 40 collects the data that are released from the data providers 50 when the request and the customer's properties meet the particular requirements imposed by the data providers 50. The collated data are analysed to provide the information in the form of data analytics provided to the customer 20.

Figure 9:
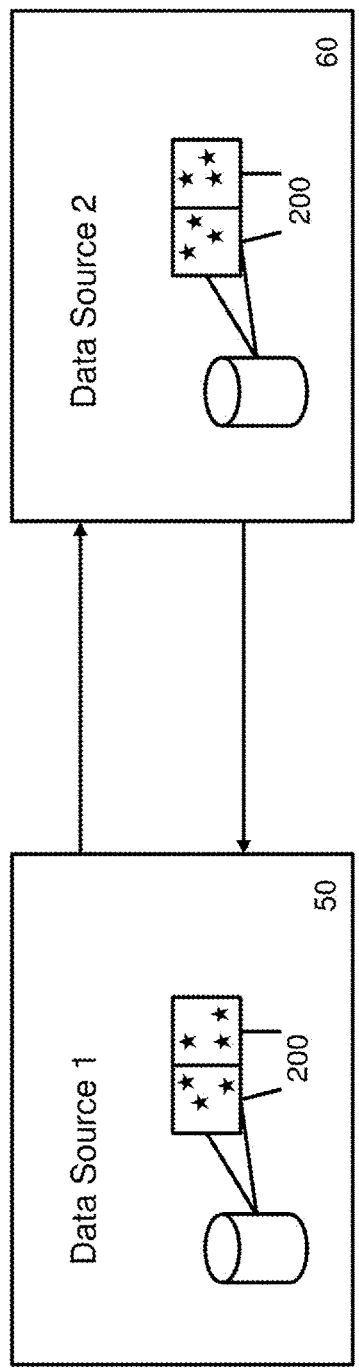
FIG. 9 shows a schematic diagram of an anonymization system.

FIG. 9 shows schematically a method for anonymizing the data at separate data sources 50, 60. In this example, two data sources are shown but any number of two or more may be used. The data may be anonymized so that only each data source has or requires access to the non-anonymized data but the resultant anonymized data sets from each data source 50, 60 may still be combined.

This requires data subsets 200 to be formed from each separate data set in a way that allows one data subset from one data source 50 to be combined with another data subset from data source 60. Each data subset 200 has one or more property or value that is assigned to each data point or data item within subset 200. For example, this value may relate to the age of individuals within each data subset 200. For large data sets then there may be many individuals within each data subset 200 having the same age when defined by a particular year. However, as the level of granularity or preciseness of this value is increased then the number of individuals in each data subset 200 may reduce. For example, if the age is defined in a range of years (e.g. 30 to 40 years old) then this may represent a course level of granularity. Separating a data set into subsets based on a ten-year range of ages may result in many subjects being placed into each data subset 200. The higher the number of individuals or data points within a data subset 200 then the stricter the level of anonymization is considered. This is because where many individuals are found within a data subset 200 then it is difficult or impossible to identify particular personal details of a single individual (e.g. their age). However, if a higher level of granularity is applied to the data set to divide it into much smaller data subsets, e.g. dividing the data subset into individuals by year and month age, then the number present in each data subset 200 will be much smaller, possibly leading to the ability to identify ages of individual people.

The higher the granularity, then the more useful the data may be for analysis purposes. Therefore, these requirements lead to a condition that data sets are divided into data subsets having a minimum number of individuals with the granularity as small as possible. However, a level of granularity that may be sufficient for the data from data source 50 may not be acceptable when applied to the data from data source 60. One solution may be to provide both data sets to a third party that can combine them and then apply a procedure having parameters that correctly generates data subsets according to this particular requirement. However, providing a data set from a data source in a non-anonymized form presents a security or data risk.

A solution is for one of the data sources 50 to determine a procedure having parameters that can be successfully applied to its data set resulting in data subsets being as small as possible yet having the required minimum number of items within them. The first data source 50 then provides the second data source with this procedure or at least parameters describing this procedure (the procedure may be defined in advance or selected by either or both data source) so that it can be tested on its own data set to determine if it generates the required outcome having data subsets 200 meeting the particular criteria. If this is successful then the second data source 60 can apply the same procedure resulting in data subsets 200 having similar attributes (e.g. the same age ranges for every item or individual within each data subset 200). In this example, it is only the age of each individual that is considered the personal information but there may be more than one item that needs to be obscured or masked in this way. Once the data subsets are formed in each data source 50, 60 then the actual ages of individuals may be removed from each data item and replaced with a simple label defining the data subset 200 that they belong to. This may be described as the simplest form of anonymization that is carried out but more complex forms may take place. It can be seen that combining subsets with different attributes can be difficult or impossible (e.g. it may not be possible to combine subsets defined by age ranges separated by 2 years and 9 years).

If the parameters of the division procedure provided on the first data source 50 to the second data source 60 are not acceptable to second data source 60 then they may be amended or changed so that they are now acceptable to data source 60. Data source 60 then sends information describing these amendments or the new parameters back to the first data source 50 as shown in the arrows between the data sources. The first data source 50 then tests these new parameters to determine if they are acceptable for its data set and if they are, then they are instead used to divide its data set. If not acceptable, then further amendments are made by the first data source 50 and sent back to the second data source where the process may repeat until an acceptable form of the procedure and its parameters are agreed by both data sources 50, 60.

It is noted that at no time any actual data from within the data set is passed outside of each data source.

The procedure described with reference to FIG. 9 is a simple example as it only relates to anonymizing a single data attribute of individuals described within each data set. However, there may be several items that require anonymization. For example, the data sets may be divided into subsets of data 200 where each individual or data point within each subset 200 meets two or more criteria (e.g. age and home location). For home location, the level of granularity may be based on postcode (for example) with the level of granularity increasing as the number of characters within a postcode increases. For example, it may be that for large data sets it may be possible to divide according to both age in years and postcode to four characters and still have a minimum number of individuals within each data subset 200 (e.g. more than one). However, whilst this may be acceptable for the first data source 50, the second data source 60 may determine that to achieve a minimum number of entries within each data subset 200, the age granularity must increase to a range of 5 years and so parameters indicating this change to the division procedure or algorithm are sent back to the first data source 50. However, if data source 50 determines that this change results in an unacceptably large number of items within the resultant data subsets 200 then it may return back to the second data source 60 with age ranges defined by two years but with postcodes limited to three characters. The procedure may loop or continue until an acceptable set of outputs is provided.

As can be seen by the skilled person, even for a relatively low number of parameters to divide data, there can be a large number permutations and options. Therefore, there may be other constraints placed on the loop or repetition of the process, especially if it takes a long period of time to test the particular parameters. Therefore, the procedure may continue until a certain number of loops has occurred or after a particular time has lapsed, for example.

Figure 10:
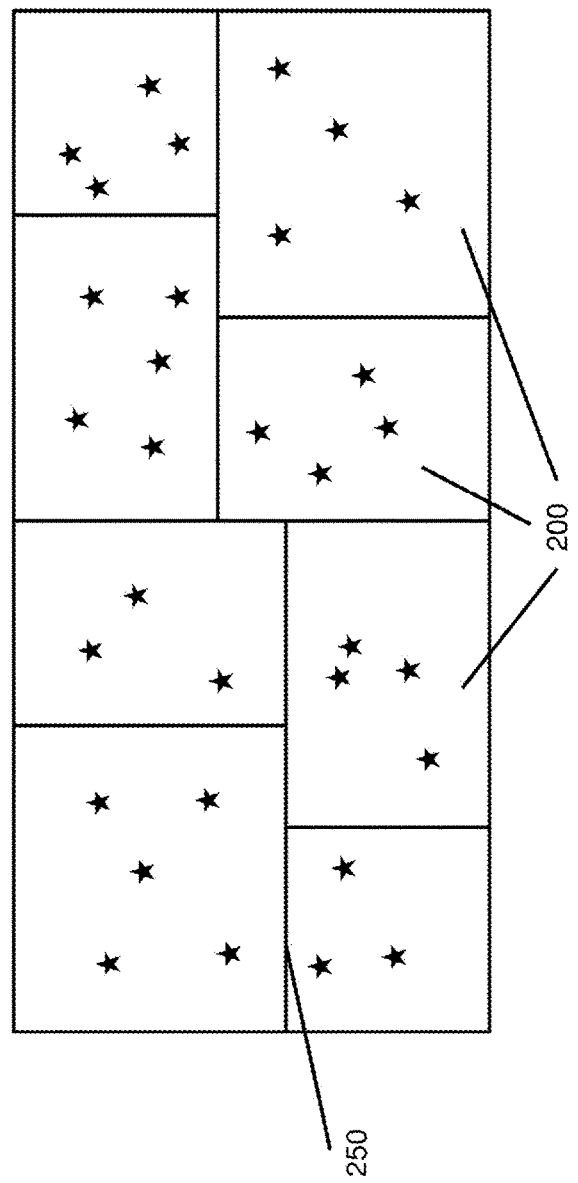
FIG. 10 shows a schematic diagram of a data set anonymized using the system of FIG. 9.

FIG. 10 shows an example data set after successfully negotiated between the two data sources 50 and 60 to divide the data appropriately. As can be seen, lines of division 250 between data subsets 200 are shown schematically but these actually represent data attributes that may be replaced with a more generalised or anonymized value to achieve the desired level of anonymization and data security.

Separately, other anonymization techniques may be used to protect individuals and their personal information. For example, names, telephone numbers, account numbers, and other personal information may be removed, replaced, tokenised or encrypted according to known techniques, on top of the procedure described here.

Although FIG. 9 shows two data sources, there may be any number of two or more that exchange parameters for dividing their data sets in the way described. The parameters (or other definition data for the procedure) may pass as a round robin between them until agreement is reached or a limit is breached, meaning the procedure has to stop. For example, several data sources may adjust the parameters so that the size of their data subsets 200 reduces without breaching the smallest size limit. However, this improvement may be limited, with one or more other data sources providing a worse outcome for additional iterations of the process. Therefore, there may be further ways to ensure that such a worsening does not continue.

Further example procedures for dividing the data into data subsets 200 include the following. A simple rule may include a line (or divider) passed across the data set defined logically in two dimensions. Additional rules may define further lines or dividers. The data set may be divided in this way (e.g. with members each side of the line meeting or not meeting one or more conditions of the rule) with new rules added or defined within each data subset (i.e. sub-division of the subsets) until the condition that each smaller subset has k or fewer members is breached. No lines can be added to breach this condition. Parameters defining such rules are passed between the data sources 50, 60.

Even if each data source 50 cannot amend the rule to meet the condition, it may still pass an amended set of parameters back that form an improved result (i.e. to include more members in the subsets even though this number is less than k). The system can determine if there is improvement or degradation and prompt or adjust the rules accordingly.

Another method looks for the centroid of data point within a data set. K-means clustering can identify clusters of members to be included in subsets. A bisector can divide the clusters. The parameters passed between the data sources 50, 60 can move the centroid points until a more equal weighting of points occurs. This technique can be improved by support vector machine learning to improve the efficiency of the process. Boolean rules may also be used.

Figure 11:
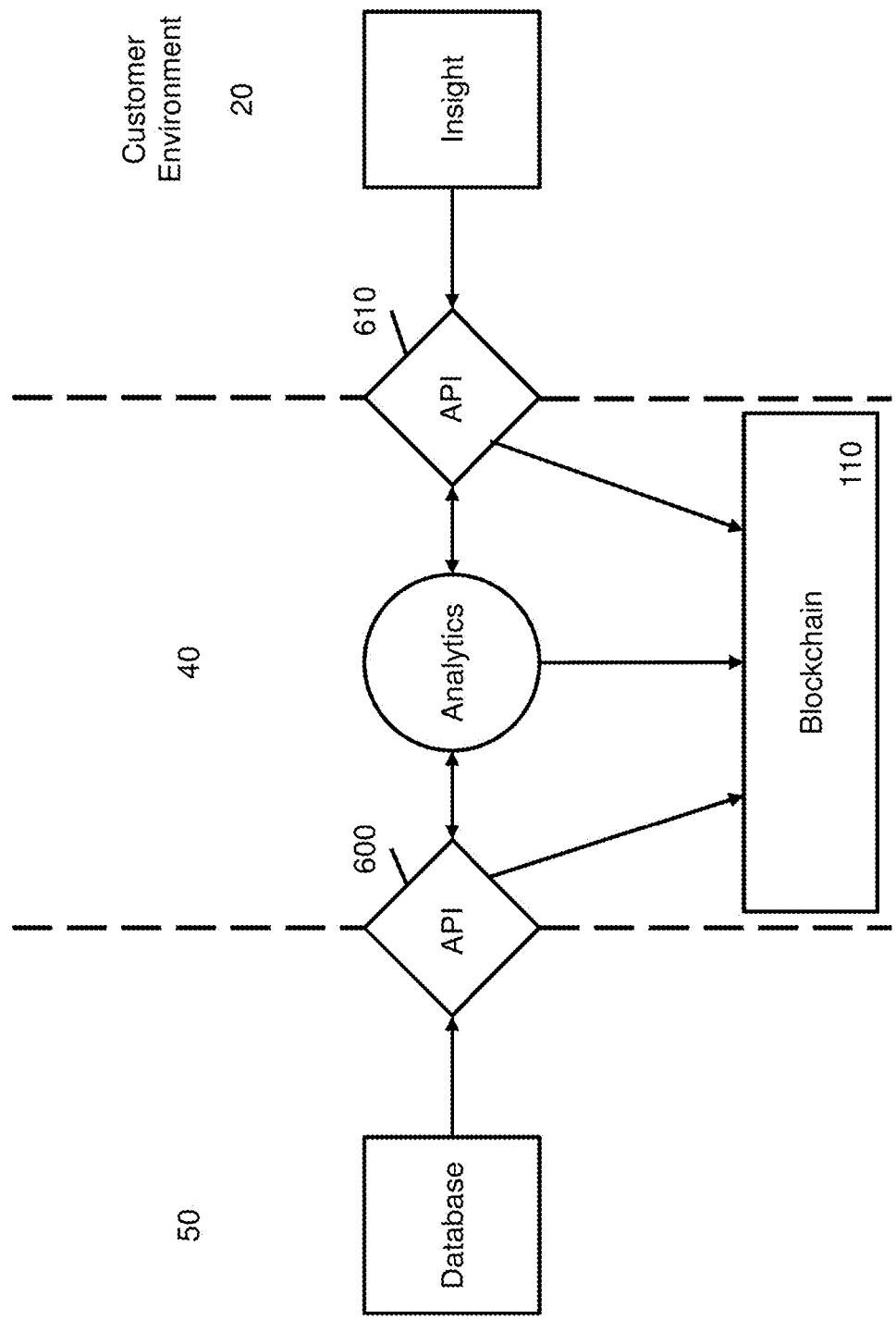
FIG. 11 shows a schematic diagram for a further example implementation of the system of FIG. 1.

FIG. 11 shows a further example implementation of the system but indicates APIs that act as interfaces with the platform 40. In particular, API 600 is an interface between the data source 50 and the platform 40 and API 610 is an interface with the customer 20. The APIs also interact with the blockchain 110.

When a data source 50 wishes to provide data then they can submit information that describes those data for use by the system. The data sources 50 therefore do not need to provide any data, even anonymized data, until it is required. The data provider 50 specifies a specific industry or individual entities that cannot utilise its data for insights or analysis. This can then be implemented as a clause within the smart contract 100. This submitted information may be included in a data form created by the data source 50, which may include a number of identifying criteria for the exclusions e.g. industry, turnover, transaction volume, customers, etc. These conditions may be specified the smart contract 100, which will then pull these criteria from the form. When a requester or customer requests information derived from the offered date then the smart contract clause is triggered to a determine whether the data provider 50 allows use of the data for the customer 20 (have particular properties). If an exception occurs to prevent this then a flag is raised and the system 10 blocks the request. This event may be stored within the blockchain 110. Assuming no exception occurs then this is also recorded and the process continues as described above.

Throughout the process there are several commits to the blockchain 110. Assuming a successful end-to-end process (i.e. described with reference to FIGS. 1 to 7) then the following describes the transactions added to the blockchain and what they represent.

1. Data request from customer 20—No hash, transaction creation.

2. Form completed—Hash of request form on to blockchain 110.

3. Request sent to management system 30—Transaction occurs.

4. Management system 30 sends to platform 40 to process request—transaction occurs.

5. Data source(s) identified based on customer request and data requested—Individual transactions are sent to each data source 50, conditions are checked by the smart contract 100.

6. Data request processed by data source 50.

a. Data is packaged, anonymized—Hash of dataset is input into a transaction on blockchain 110.

b. Data is transmitted to platform 40—Transaction initiated on the blockchain 110.

7. Data is received by platform 40.

a. Each provider has a separate transaction on the blockchain 110.

b. All transactions converge on single address.

8. Insight (analysis) generated—Hash of combined data sources created to represent produced insight.

9. Insight sent to consumer—Transaction occurs showing return of insight to original request.

10. Project tear down, data deleted—Recorded into the blockchain 110.

In an example implementation, the smart contract 100 and associated functions may be located within a virtual machine (not shown in the figures). The smart contract 100 may be integrated with the blockchain 110 with integration via APIs (as shown in FIG. 11).

An alternative implementation of the anonymization process (that may be used in isolation or in combination with any of the other techniques mentioned throughout) may use deterministic and overlapping clustering techniques such that, even though different parameters may be used by each party to preserve their respective k-anonymity, the system 10 can guarantee that partitions (i.e. from different data sources) are consistent, and even though they may be of different sizes. Therefore, such separate partitions may still be joined together or otherwise combined. The system 10 may use techniques similar to semantic hashing or semantic partitioning.

One particular example implementation may be focused on geographic information insights as such data may offers deterministic and well-defined boundaries that could be used for semantic partitioning.

GeoHashing techniques can typically have a granularity spanning from half of the globe down to a 1 mm×1 mm grid size. Alternatively, human defined boundaries may be used (such as Local authorities, County, Postcode, etc.). The system 10 guarantees that any polygon size used by one party or data sources is included or includes polygon(s) generated by another party or data source without requiring the data sources to exchange any information. This differs from the previously described anonymization techniques that require an exchange of parameters, possibly over several iterations.

As an example, the UK postcode SE10 is entirely included in Greenwich borough, which is entirely included in Greater London. Furthermore, this technique allows a particular data owner or data source to anonymize his/her data with different levels of precision depending on whether individuals are located in rural or more densely populated urban areas. An advantage of using GeoHashing technique is the flexibility available to drill down to specific zones with no loss of information.

Figure 12:
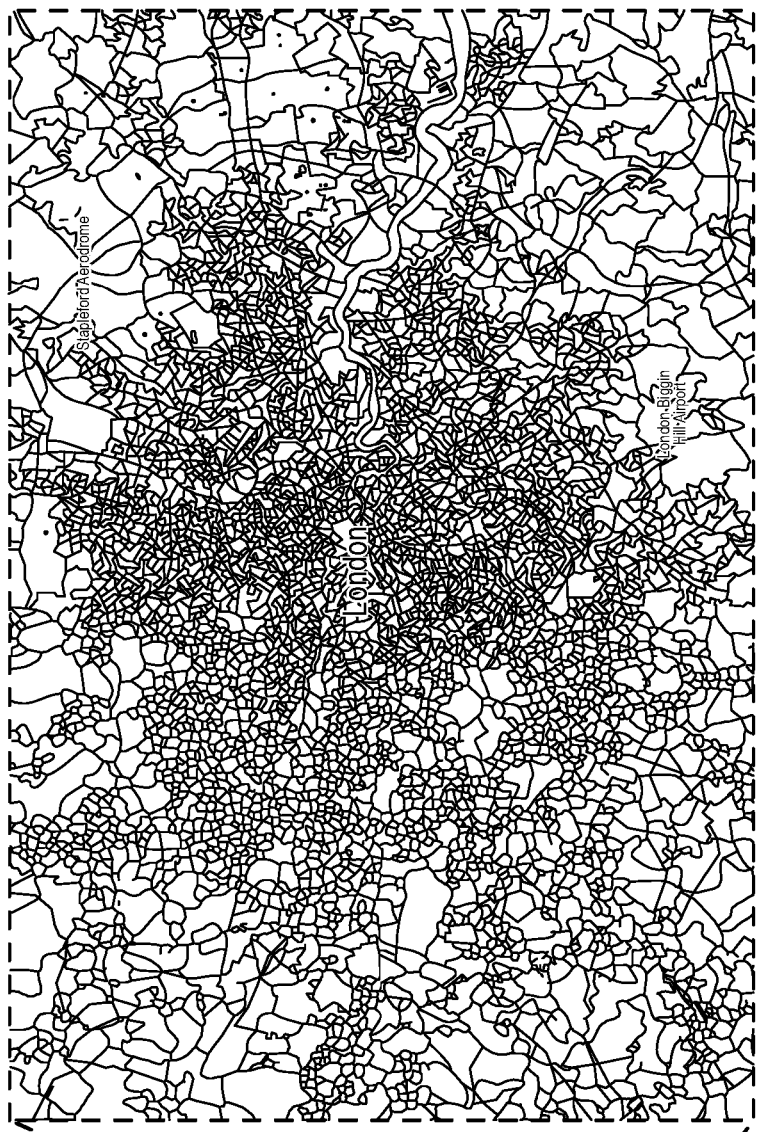
FIG. 12 shows a schematic diagram illustrating geographic partitioning of data, according to an example implementation.
Figure 12:
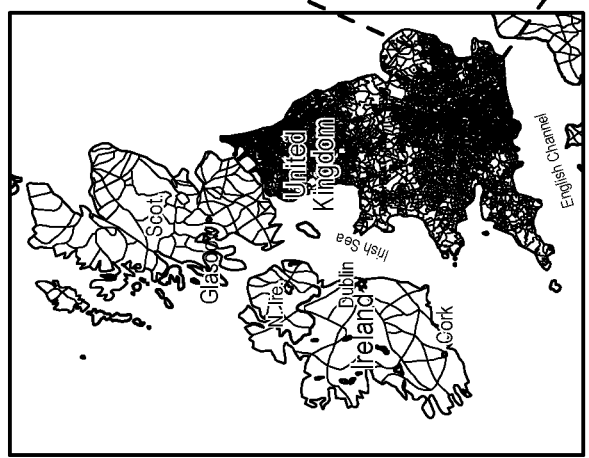

An advantage of using government-defined boundaries is that this provides a self-describing polygon that make sense for any derived insights (everyone knows what "London" means, whereas there is limited understanding regarding the geohash "gcpu", for example). An example of an England geopshape file created for this purpose is shown in FIG. 12.

Figure 13:
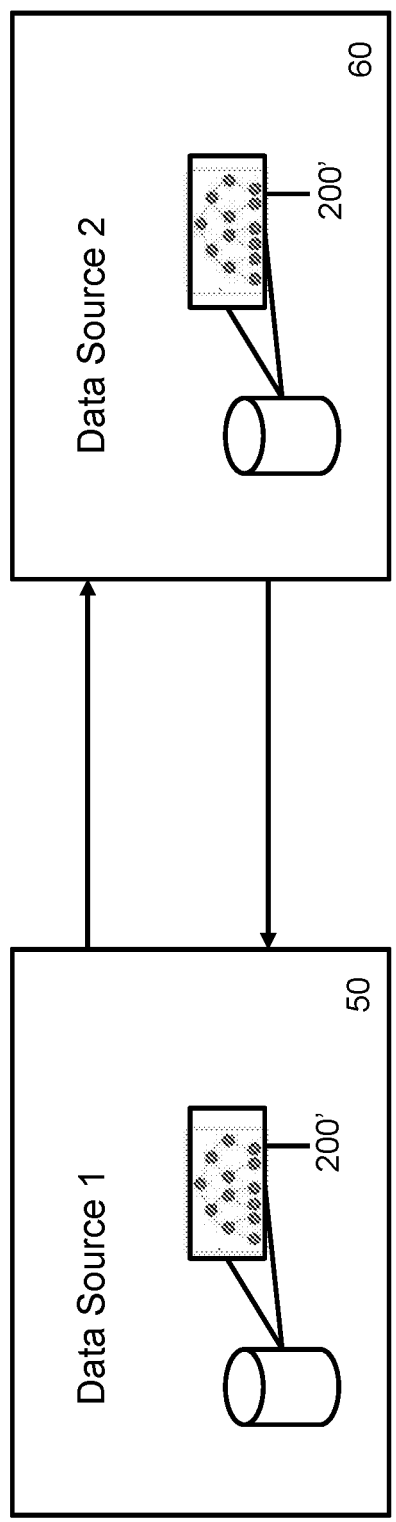
FIG. 13 shows a schematic diagram of a further anonymization system and method.

Whilst these examples are based on geographic areas, the technique may be generalised to use generic partitioning. Therefore, the process of partitioning may be extended to different features assuming that these dimensions can be represented as a topological graph (i.e. tree) data structure. Such a model is illustrated schematically in FIG. 13. In this example, data source 1 and data source 2 need not exchange information describing a level of anonymity used in their model or applied to their data sets 200' but would access the same hierarchy used to guarantee their own k-anonymity independently. This further improves anonymity and reduces the level of necessary data exchange between data sources.

As will be appreciated by the skilled person, details of the above embodiment may be varied without departing from the scope of the present invention, as defined by the appended claims.

For example, the anonymization procedure may be used to anonymize two more or more different data sets with or without the other blockchain-related features or the smart contract. Events within the anonymization procedure may also be stored within the blockchain.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for anonymizing data comprising:
   at a first source of data determining one or more parameters of a procedure for dividing a first data set into subsets of data, such that each subset of data meets one or more criteria;
   providing the parameters to a second source of data;
   at the second source of data amending the parameters such that the procedure will divide a second data set data into subsets of data that each meet the one or more criteria; providing the first source of data with the amended parameters;
   at the first source of data dividing the first data set into subsets of data according to the procedure operating according to the amended parameters;
   at the second source of data dividing the second data set into subsets of data according to the procedure operating according to the amended parameters;
   anonymizing the subsets of data from the first source and the subsets of data at the second source; and
   combining the anonymized subsets of data.

2. The method of claim 1, wherein each subset of data has one or more attributes and the combining the anonymized subsets of data further comprises: combining each of the subsets of data from the first source with a subset of data from the second source having one or more corresponding attributes.

3. The method of claim 1, wherein the procedure is a clustering algorithm.

4. The method of claim 3, wherein the clustering algorithm is k-means clustering.

5. The method of claim 1, wherein the one or more criteria include a requirement for a minimum number of items in each subset of data.

6. The method of claim 1, wherein the one or more parameters are amended and exchanged until the one or more criteria are met for both data sources.

7. The method of claim 6, before anonymizing and combining the anonymized subsets of data, further dividing each subset of data by:

at the first source of data determining one or more further parameters of a procedure for dividing a first data set into subsets of data, such that each subset of data meets one or more criteria;

providing the further parameters to the second source of data;

at the second source of data amending the further parameters such that the procedure will divide a second data set data into subsets of data that each meet the one or more criteria;

providing the first source of data with the amended further parameters;

at the first source of data dividing the first data set into subsets of data according to the procedure operating according to the amended further parameters; and at the second source of data dividing the second data set into subsets of data according to the procedure operating according to the amended parameters.

8. The method of claim 1, wherein the providing the amended parameters to the first and second sources repeats for a predetermined time and/or number of iterations.

9. A non-transitory computer readable medium storing processor executable instructions that, when executed by at least one processor, cause the at least one processor to carry out the method of claim 1.

10. A method of providing information derived from data from at least two sources, the method comprising:

receiving a request for information from a requester having one or more requester properties, wherein the requested data is derived from data from a first source and a second source;

determining if the one or more requester properties meet one or more predetermined criteria defined by the first source;

determining if the one or more requester properties meet one or more predetermined criteria defined by the second source;

responsive to the one or more requester properties meeting the predetermined criteria defined by the first source, providing the requested information derived from data from the first source to the requester;

responsive to the one or more requester properties meeting the predetermined criteria defined by the second source, providing the requested information derived from data from the second source to the requester; and storing data describing the request within a blockchain, wherein before the requested information derived from the data is provided from the first source and the second source, the data from both the first source and the second source are anonymized at their respective sources and combined, and wherein the data are anonymized and combined by:
at the first source determining one or more parameters of a procedure for dividing a first data set into subsets of data, such that each subset of data meets one or more data criteria;
providing the parameters to the second source;
at the second source amending the parameters such that the procedure will divide a second data set data into subsets of data that each meet the one or more data criteria; providing the first source of data with the amended parameters;
at the first source dividing the first data set into subsets of data according to the procedure operating according to the amended parameters;
at the second source dividing the second data set into subsets of data according to the procedure operating according to the amended parameters;
anonymizing the subsets of data from the first source and the subsets of data at the second source; and
combining the anonymized subsets of data.

11. The method of claim 10, wherein each subset of data has one or more attributes and the step of combining the anonymized subsets of data further comprises: combining each of the subsets of data from the first source with a subset of data from the second source having one or more corresponding attributes.

12. The method of claim 10, wherein the procedure is a clustering algorithm.

13. The method of claim 12, wherein the clustering algorithm is k-means clustering.

14. The method of claim 10, wherein the one or more data criteria include requirement for a minimum number of items in each subset of data.

15. The method of claim 10, wherein the one or more parameters are amended and exchanged until the one or more data criteria are met for both data sources.

16. A non-transitory computer readable medium storing processor executable instructions that, when executed by at least one processor, cause the at least one processor to carry out the method of claim 10.

17. A system comprising:
at least one processor; and
at least one memory storing computer-readable instructions that, when executed by the at least one processor, cause the system to perform:
at a first source of data determining one or more parameters of a procedure for dividing a first data set into subsets of data, such that each subset of data meets one or more criteria;
providing the parameters to a second source of data;
at the second source of data amending the parameters such that the procedure will divide a second data set data into subsets of data that each meet the one or more criteria;
providing the first source of data with the amended parameters;
at the first source of data dividing the first data set into subsets of data according to the procedure operating according to the amended parameters;
at the second source of data dividing the second data set into subsets of data according to the procedure operating according to the amended parameters;
anonymizing the subsets of data from the first source and the subsets of data at the second source; and
combining the anonymized subsets of data.

18. A system comprising:
at least one processor; and
at least one memory storing computer-readable instructions that, when executed by the at least one processor, cause the system to perform:
receiving a request for information derived from data from a requester having one or more requester properties, wherein the requested information is derived from data from a first source and a second source;
determining if the one or more requester properties meet one or more predetermined criteria defined by the first source;
determining if the one or more requester properties meet one or more predetermined criteria defined by the second source;

responsive to the one or more requester properties meeting the predetermined criteria defined by the first source, providing the requested information derived from data from the first source to the requester;

responsive to the one or more requester properties meeting the predetermined criteria defined by the second source, providing the requested information derived from data from the second source to the requester; and storing data describing the request, the requested data and the requester within a blockchain, wherein before the requested information derived from the first source and the second source is provided, the data from both the first source and the second source are anonymized at their respective sources and combined, and wherein the data are anonymized and combined by:

at the first source determining one or more parameters of a procedure for dividing a first data set into subsets of data, such that each subset of data meets one or more data criteria;

providing the parameters to the second source;

at the second source amending the parameters such that the procedure will divide a second data set data into subsets of data that each meet the one or more data criteria;

providing the first source of data with the amended parameters;

at the first source dividing the first data set into subsets of data according to the procedure operating according to the amended parameters;

at the second source dividing the second data set into subsets of data according to the procedure operating according to the amended parameters;

anonymizing the subsets of data from the first source and the subsets of data at the second source; and combining the anonymized subsets of data.

* * * * *